United States Patent
Han et al.

(10) Patent No.: US 10,257,090 B2
(45) Date of Patent: Apr. 9, 2019

(54) PACKET CLASSIFICATION USING MULTI-DIMENSIONAL SPLITTING

(71) Applicant: Futurewei Technologies, Inc., Plano, TX (US)

(72) Inventors: Xuefeng Han, Santa Clara, CA (US); Wei Xu, Dublin, CA (US); Yan Sun, Santa Clara, CA (US); Xiaohe Hu, Beijing (CN); Danyang Li, Beijing (CN); Zhi Liu, Beijing (CN); Jun Li, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 66 days.

(21) Appl. No.: 15/438,317

(22) Filed: Feb. 21, 2017

(65) Prior Publication Data

US 2018/0241668 A1 Aug. 23, 2018

(51) Int. Cl.
| | |
|---|---|
| *H04L 12/741* | (2013.01) |
| *H04L 12/893* | (2013.01) |
| *H04L 12/823* | (2013.01) |
| *H04L 12/24* | (2006.01) |
| *H04L 12/743* | (2013.01) |

(52) U.S. Cl.
CPC .............. *H04L 45/74* (2013.01); *H04L 41/12* (2013.01); *H04L 47/32* (2013.01); *H04L 47/40* (2013.01); *H04L 45/7457* (2013.01)

(58) Field of Classification Search
None
See application file for complete search history.

(56) References Cited

U.S. PATENT DOCUMENTS

| 7,193,997 B2 | 3/2007 | Van Lunteren et al. |
| 7,688,761 B2 | 3/2010 | Paramaguru |
| 8,521,751 B2* | 8/2013 | Ichino ............... G06F 17/30985 |
| | | 707/754 |

(Continued)

FOREIGN PATENT DOCUMENTS

| CN | 1992674 A | 7/2007 |
| CN | 103888350 A | 6/2014 |

OTHER PUBLICATIONS

Taylor, David E., et al., "Classbench: a packet classification benchmark," Applied Research Laboratory, Dept. of Computer Science and Engineering, Washington University in Saint Louis, May 21, 2004, 37 pages.

(Continued)

*Primary Examiner* — Candal Elpenord
(74) *Attorney, Agent, or Firm* — Vierra Magen Marcus LLP

(57) ABSTRACT

A computer-implemented method classifies a packet received from a network. The method comprises receiving the packet having header information and a rule-set that indicates a plurality of actions to perform on the packet. A geometric representation of the rule-set is constructed having a plurality of dimensions and rule boundaries. At least one rule boundary and dimension of the geometric representation is split to form a search structure having a plurality of nodes. Each node in the plurality of nodes is constrained to a predetermined memory threshold. The search structure is searched using the header information to obtain a rule in the rule-set that indicates an action to take on the packet.

17 Claims, 14 Drawing Sheets

(56) References Cited

U.S. PATENT DOCUMENTS

| | | | | |
|---|---|---|---|---|
| 2004/0264373 A1* | 12/2004 | Engbersen | ............. | H04L 49/90 370/230 |
| 2010/0080223 A1* | 4/2010 | Wong | ..................... | H04L 45/00 370/392 |
| 2013/0034100 A1* | 2/2013 | Goyal | ..................... | G06N 5/02 370/392 |
| 2016/0094460 A1* | 3/2016 | Shelar | ..................... | H04L 45/56 370/392 |
| 2016/0248739 A1* | 8/2016 | Bouchard | ................ | G06N 5/02 |
| 2017/0052731 A1* | 2/2017 | Levy | ................ | G06F 17/30598 |

OTHER PUBLICATIONS

PCT/CN2018/076749, ISR, dated May 10, 2018.

* cited by examiner

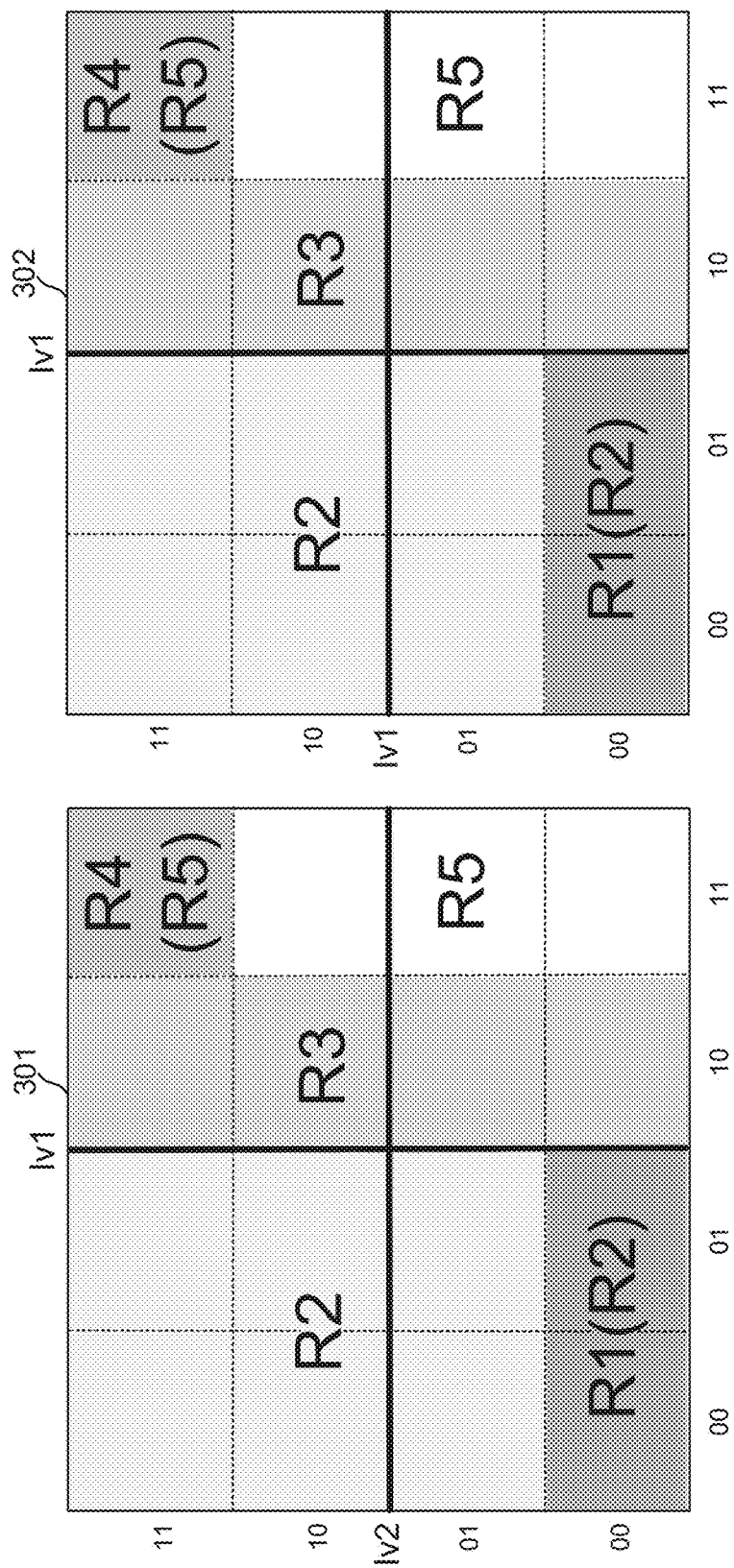

Search Process Method 1000

Node ← T.root
While node.d2s ≠ null do
  index ← 0
  for all i ∈ node.d2s do
    j ← 0
    while pkt[i] > node.thresh[i][j] do
      j++
    end while
    index ← (index + j) * i
  end for
  node ← node.child[index]
end while
return node.thresh

Fig. 10

PACKET CLASSIFICATION USING MULTI-DIMENSIONAL SPLITTING

BACKGROUND

Networks contain multiple functions to deliver and modify packets to provide services for end users. Network functions like switching, routing, access control, firewall, quality of service and intrusion detection operate on packets according to a set of predefined network rules. For each incoming packet, a packet classifier may be used to search on a rule-set and returns an action of a first priority matched rule, which may be executed on the packet by a subsequent component in a network.

SUMMARY

In a first embodiment, the present technology relates to a computer-implemented method to classify a packet received from a network. The method comprises receiving the packet having header information and a rule-set that indicates a plurality of actions to perform on the packet. A geometric representation of the rule-set is constructed having a plurality of dimensions and rule boundaries. A rule boundary and dimension of the geometric representation is split to form a search structure having a plurality of nodes. A node in the plurality of nodes is constrained to a predetermined memory threshold. The search structure is searched using the header information to obtain a rule in the rule-set that indicates an action to take on the packet.

A second embodiment in accordance with the first embodiment, wherein the splitting the rule boundary and splitting the dimension includes having k-splits on n-dimensions for each node.

A third embodiment in accordance with the first through the second embodiments, wherein the search structure is a decision tree structure having a plurality of nodes stored in non-volatile memory. The decision tree structure includes a plurality of depths with a plurality of leaf nodes in the plurality of nodes to store a plurality of rules from the rule-set. The searching includes recursively traversing each depth in the plurality of depths to obtain the rule from a leaf node in the plurality of leaf nodes.

A fourth embodiment in accordance with the first through the third embodiments, wherein constraining the node in the plurality of nodes includes completing a read operation of the node within a memory access time.

A fifth embodiment in accordance with the first through the fourth embodiments, wherein the rule-set includes a plurality of rules and a set of corresponding priority values and a set of corresponding field values.

A sixth embodiment in accordance with the first though the fifth embodiments, wherein the header information includes one or more header fields to store a binary value that matches a field value in the set of corresponding field values.

A seventh embodiment in accordance with the first though the sixth embodiments, wherein the action to take on the packet includes accept or discard the packet.

An eighth embodiment in accordance with the first though the seventh embodiments, wherein the geometric representation is a D-dimensional search space having N non-overlapping D-dimensional hyper-rectangles.

A ninth embodiment in accordance with the first through the eighth embodiments, wherein the computer-implemented method is performed by one or more integrated circuit processors in communication with one or more integrated circuit memories.

In a tenth embodiment, the present technology relates to a device comprising a memory storage comprising instructions and one or more processors in communication with the memory. The one or more processors execute the instructions to receive a plurality of packets. A rule-set having a plurality of rules is also received. A search structure is constructed having a plurality of nodes based on the rule-set. The search structure is constructed by using k-splits on n-dimensions for each node in the plurality of nodes. The plurality of rules is stored in a plurality of leaf nodes in the plurality of nodes. The search structure is searched by using information from a packet in the plurality of packets to obtain a rule to perform on the packet. The rule is stored in a leaf node in the plurality of leaf nodes.

In an eleventh embodiment, the present technology relates to a non-transitory computer-readable medium storing computer instructions, that when executed by one or more processors, cause the one or more processors to perform the following steps. Receive a packet having header information from a plurality of packets and a plurality of rules that indicates a plurality of actions to perform on the packet. A decision tree structure having a plurality of nodes is constructed by k-splits on n-dimensions of each node in the plurality of nodes based on the plurality of rules. The plurality of nodes include a plurality of leaf nodes to store the plurality of rules. An access to each node in the plurality of nodes is constrained to a memory access time. The decision tree structure is searched using the header information to obtain a rule in the plurality of rules stored in the plurality of leaf nodes that indicates an action to take on the packet.

This Summary is provided to introduce a selection of concepts in a simplified form that are further described below in the Detailed Description. This Summary and/or headings are not intended to identify key features or essential features of the claimed subject matter, nor is it intended to be used as an aid in determining the scope of the claimed subject matter. The claimed subject matter is not limited to implementations that solve any or all disadvantages noted.

BRIEF DESCRIPTION OF THE DRAWINGS

FIG. 3 illustrates a space decomposition of a geometric representation of a rule-set using HiCuts or HyperCuts methods for packet classification.

FIG. 10 illustrates search method according to embodiments of the present technology.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
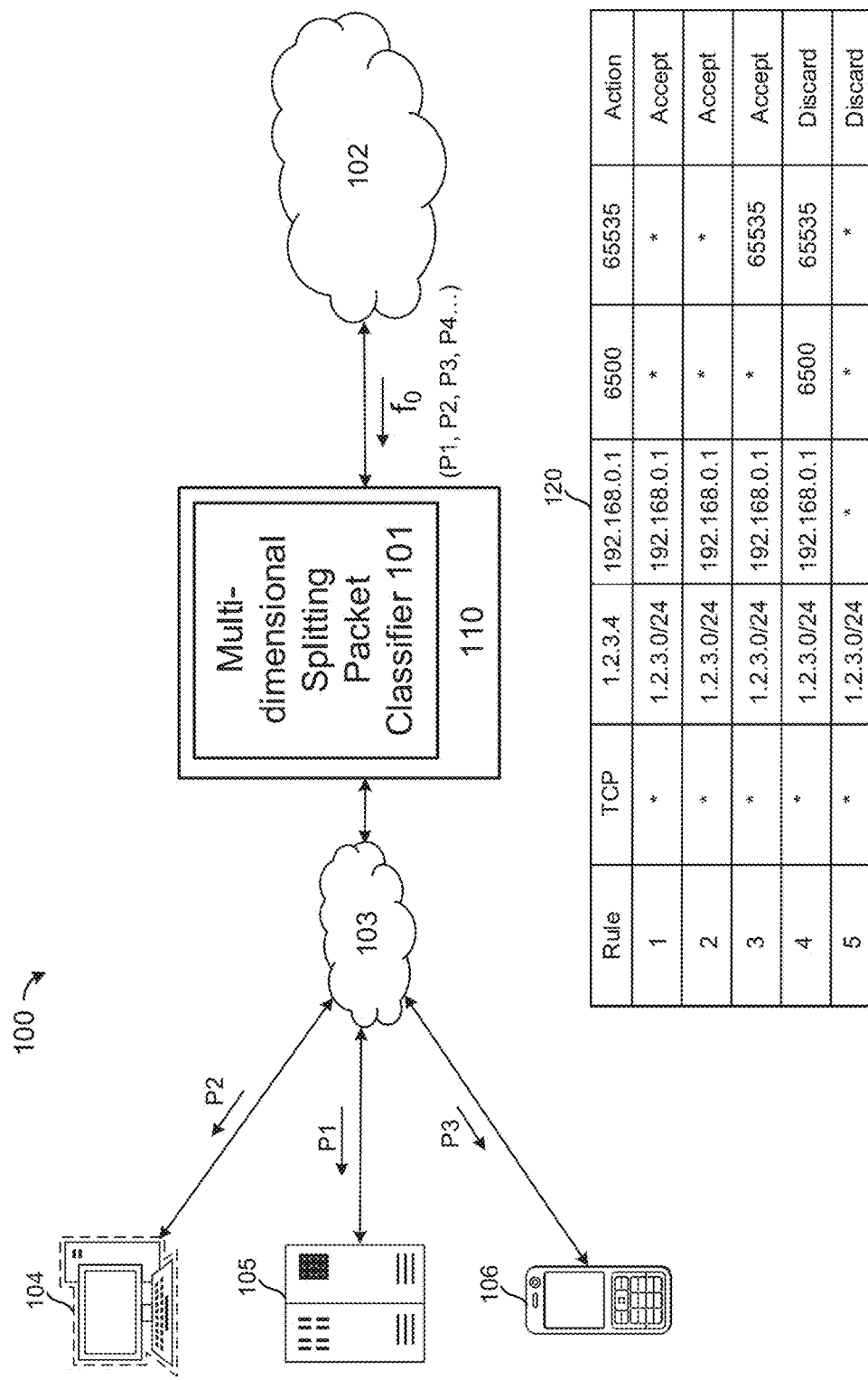
FIG. 1 is block diagram that illustrates a network that implements a packet classification using multi-dimensional splitting apparatus according to embodiments of the present technology.

The present technology generally relates to a method, apparatus and computer-readable medium to classify packets from a network, known herein as FastSplit. FastSplit includes at least two stages in an embodiment. A first stage includes constructing a search structure having a plurality of nodes stored in memory, such as a decision tree structure, for a particular rule-set. A decision tree structure may be constructed from splitting a geometric representation (search space) of the rule-set that includes multi-dimensions and rule boundaries. Rules that indicate particular actions to take on a particular packets may be stored in leaf nodes of the decision tree structure. A second stage includes searching the decision tree structure for each incoming packet using header information of the incoming packet to obtain a particular rule stored in a leaf node.

The present technology may achieve better performance in terms of search speed (less memory access time) while using less memory space as compared to previous HiCuts, HyperCuts and HyperSplit packet classifying methods. Compared to a HyperSplit method which conducts a single split on one dimension for each node, FastSplit leverages k-splits on n-dimensions for each node to accelerate the search speed and compact the memory space usage. Experiments on both synthetic and real-world data-sets demonstrate that FastSplit embodiments may achieve less memory access times while using less memory as compared to other methods.

FastSplit constructs a decision tree structure having a plurality of nodes that stores rules from a rule-set in leaf nodes in an embodiment. At least one difference between FastSplit and previous packet classifying methods is in node construction (i.e. the per-decomposition stage). In an embodiment, three key points of the node construction in FastSplit are listed as follows:

Rule Boundary Splitting (Each Space Decomposition): FastSplit splits a search space along a rule boundary, which reduces rule replication possibility in embodiments. The rule boundary that FastSplit selects is guided by a heuristic selection strategy aimed to construct a decision tree structure as balanced as possible in an embodiment. Compared with HiCuts and HyperCuts methods, FastSplit reduces duplication in different search spaces in an embodiment.

Multi-dimensional Splitting: FastSplit conducts k-splits on n-dimensions for each tree node to make full use of the global heuristic information, which may ensure the rule number of each child node decreases as fast as possible in an embodiment. Compared with a HyperSplit method's one dimension split that forms a binary tree, FastSplit uses multi-dimensional splitting, quickly reducing a decision tree depth in an embodiment.

Memory Constraints: FastSplit limits the memory size of each node under a memory threshold $T_{mem}$, a hardware component's intrinsic cache line size, to enable a read operation of a node to be completed within one memory access time.

Once a decision tree structure is constructed from a rule-set, header information from each incoming packet may be retrieved and used to recursively traverse each depth of the decision tree structure and return a rule stored in a leaf node. The rule may indicate an action to take on a particular packet. For example, a rule or action to take may include accept or discard the incoming packet in a packet classifier firewall embodiment.

It is understood that the present technology may be embodied in many different forms and should not be construed as being limited to the embodiments set forth herein. Rather, these embodiments are provided so that this disclosure will be thoroughly and completely understood. Indeed, the disclosure is intended to cover alternatives, modifications and equivalents of these embodiments, which are included within the scope and spirit of the disclosure as defined by the appended claims. Furthermore, in the detailed description, numerous specific details are set forth in order to provide a thorough understanding of the technology. However, it will be clear that the technology may be practiced without such specific details.

Packet classification may be an important component of a network. Different types of packet classification methods and their variants may address different performance requirements and platforms. Software-Defined Networks (SDNs) and Network Function Virtualization (NFV) may require efficient packet classifiers, which may run under particular memory usage constraints. Other network applications, such as Internet of Things (IOT), 5G cellular and Cloud for IT outsourcing networks, may have particular processing latency requirements.

FIG. 1 is block diagram that illustrates a network 100 that implements a packet classifier using multi-dimensional splitting according to embodiments of the present technology. In an embodiment, network 100 includes one or more networks and may be interconnected and/or intraconnected by links or signal paths between network elements. In an embodiment, a network 102 provides a traffic flow $f_0$ having a plurality of packets P1, P2, P3, P4 . . . to a network element, such as computing device 110 having multi-dimensional splitting packet classifier 101. The plurality of packets may have originated from a single source or multiple different sources within network 102. In an embodiment, computing device 110 is coupled to networks 102 and 103. Network 103 couples computing devices 104 and 105 as well as cellular telephone 106 (also a computing device) to computing device 110. In an embodiment, network 102 is the Internet.

In an embodiment, computing device 110 having multi-dimensional splitting packet classifier 101 performs a function of a firewall for network 103. In an embodiment, computing device 110 having multi-dimensional splitting packet classifier 101 accepts or discards particular incoming packets based on a rule-set 120 (in the form of a table) and particular header information in an incoming packet. For example, computing device 110 having multi-dimensional splitting packet classifier 101 discards packet P4 and accepts packet P3 that is ultimately routed to cellular telephone 106 via network 103 per rule-set 120. In an embodiment, packets P1 and P2 are routed from computing device 110 to computing devices 105 and 104 via signal paths in network 103. As one of ordinary skill in the art would appreciate multi-dimensional splitting packet classifier 101 many include hardware and/or software components. For example, multi-dimensional splitting packet classifier 101 may include logic circuits and/or computer instructions stored in memory to perform functions described herein.

In embodiments, computing device 110 includes an integrated circuit processor that executes multi-dimensional splitting packet classifier 101 embodied as a software component. Multi-dimensional splitting packet classifier 101 executed by a processor, as described in detail herein, constructs a search structure for a predetermined rule-set and searches the search structure, such as a decision tree structure having a plurality of nodes. Multi-dimensional splitting packet classifier 101 uses header information of an incoming packet to obtain a rule in the decision tree structure that indicates action to be taken on the incoming packet, such as discard or accept the packet in a firewall embodiment.

Network 100, or networks included in network 100, may be any types of network, such as an electrical network and/or an optical network. The disclosed embodiments may be employed in conjunction with any types of routing methods. Network 100 may employ any network communication protocols, such as transmission control protocol/Internet protocol (TCP/IP). Network 100 may further employ any types of network virtualization and/or network overlay technologies, such as SDN technologies and virtual extensible local area network (VXLAN) technologies. Network 100 may be a large-scale network, IP network, packet-switched network, centrally controlled SDN, cellular network, WiFi network (Institute of Electrical and Electronics Engineers' (IEEE) 802.11x)), satellite network, ad-hoc and sensor network or high-performance computing cluster (data center) network. In an embodiment, network 100 may include a multi-hop cellular network. Network 100 may operate under a single network administrative domain or multiple network administrative domains. Network 100 may interconnect with other networks. Links in network 100 may comprise physical links, such as fiber optic links, electrical links, wireless links, and/or logical links used to transport data or packets in network 100.

A network element or device, such as a firewall, switch (including switch fabric), router, bridge, intrusion detection system (IDS), quality of service (QoS), server, a client, etc may be configured to receive and forward packets in a network 100. A network element may communicate with other network elements or other networks. As shown, a network element may receive traffic flows from other networks. The traffic flows or flows may be referred to as external flows or exogenous flows. Some of the flows may include high-tail (HT) traffic, while some other flows may include low-tail (LT) traffic, or a combination thereof.

Figures 2A, 2B:
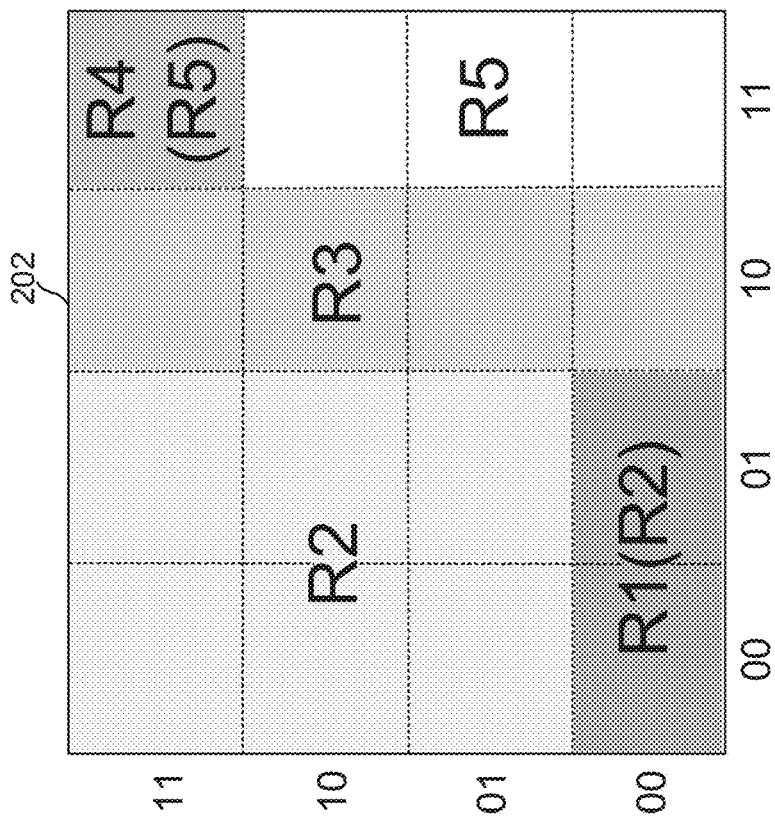
FIG. 2A illustrates a rule-set according to embodiments of the present technology.
FIG. 2B illustrates a geometric representation of the rule-set according to embodiments of the present technology.

Packet classification aims to classify packets by applying a set of rules, such as a rule-set 201 (seen as a table) illustrated in FIG. 2A, to the header fields of an incoming or received packet. A geometric representation is constructed from the rule-set 201, such as geometric representation 202 shown in FIG. 2B, to construct a search structure as described herein. In an embodiment, rule-set 201 includes a plurality (or set) of rules R1-R5 having a corresponding plurality of priority values and a corresponding plurality of header field values ("Field-x" and "Field-y"). For example, rule R1 has a priority value of "1" for "Field-x" values of [00, 01] and "Field-y" values of [00, 00] of a header field in a packet. In an embodiment, rules R1-R5 indicate a plurality of corresponding actions to take on a particular packet having the corresponding priority values and field values in a header of the packet.

Geometric representation 202 illustrates a search space or a plurality of rectangles (including overlapping rectangles) that represent the plurality of rules R1-R5 with corresponding header field values. For example, a rectangle R2 corresponds to rule R2 in rule-set 201 when a received packet has a "field-x" value between 00 and 01 on the x-axis and a "field-y" value between 01 and 11 on the y-axis. A priority value is used to determine a particular rule when there are overlapping rectangle.

Mathematically, a packet classification may be described as follows: For one rule R and one packet P, assume both of them have D dimensions, and R[f] referring to the f dimension of R is a range or prefix match expression on the f field of the packet P. A packet P is said to match a particular rule R, if $\forall f \in [1, D]$, the f field value of P satisfies the expression R[f].

A rule-set $\Sigma = \{R1, R2 \ldots RN\}$ contains N rules with the rule id as the priority of each rule. For a packet P matching rules $\{R_{p1}, R_{p2} \ldots R_{pi}\}$, $1 \leq p_1 < p_2 < \ldots < p_i \leq N$, $i \geq 1$, the final returned matching result is $R_{p1}$, which has the highest priority.

Packet classification may be viewed as a point location problem of the computation geometry area. All possible vector values in the D fields of a packet header form the D-dimensional search space S, and each packet P is modeled as a point located in space S. The expression R[f] of the rule R refers to a segment in the f dimension of the search space and all the segments specified by R compose a D-dimensional hyper-rectangle. If a packet P matches a particular rule R, the point represented by P will fall into the hyper-rectangle specified by R.

The general bounds for searching a point located in N non-overlapping D-dimensional hyper-rectangles are O(log N) time with $O(N^D)$ space or $O(\log^{D-1} N)$ time with O(N) space. Packet classification is made yet more complex due to rule overlapping. In the worst case, N overlapping rules could yield up to $(2N+1)^F$ non-overlapping hyper-rectangles. Therefore, the packet classification problem has extremely high theoretical complexity in the worst case. However, search structures suitable for a particular architecture may be constructed and searched to provide practical results.

Packet classification typically uses decomposition as well as divide and conquer compared to a linear search mechanism. In an embodiment, decomposition is defined as turning the D-dimensional search space S of an original rule-set $\Sigma = \{R1, R2, \ldots, RN\}$ into a set of D-dimensional sub search spaces $\{S1, S2, \ldots, SK\}$ with $\cup^K_{i=1} S_i = S$ and $S_i \cap S_j = \emptyset$, $1 \leq i < j \leq K$. Packet classification may differ in the following three aspects:

Pre-decomposition: Pre-decomposition methods are executed on the original rule-set before constructing the searching indexes to reduce rule replication, of which grouping and dimensional decomposition are widely adopted on the multi-dimensional packet classification problem. Grouping method clusters rules resulting in least rule replication at the searching indexes construction stage into one sub rule-set, then the incoming packet is searched on all the sub rule-sets and processed according to the highest priority rule among the sub-results.

Dimensional decomposition methods separately searches rule-sets on each dimension and cross-products the sub-results to return the final matched rule. Both grouping and dimensional decomposition trade memory access times for replication reduction.

Recur-decomposition: Recur-decomposition methods construct the searching index for one rule-set by recursion, resulting in a decision tree structure. To avoid a great recursion depth, the recursive construction times are usually constrained by a pre-defined threshold with a linear search on the rest rules. However, there are some decomposition methods executed on the rule-set for only once, either benefiting from specific pre-decomposition results or followed by linear searches on each sub rule-set.

Per-decomposition: There are different kinds of per-decomposition methods associated with specific data structures. The per-decomposition methods use efficient indexing structures and heuristically partition the parent search space into sub search spaces, aiming to balance the subspaces and reduce the replicated rule number. Hash, bit vector, bitmap, and arithmetic comparison are typically used indexes, other indexes like bloom filter can be viewed as a strengthened version of bitmap, compressed bit vector as a strengthened version of bit vector.

The following section describes the differences between HiCuts, HyperCuts and HyperCuts in constructing a typical decision tree structure that may incorporate recur-decomposition but not pre-decomposition. Their main differences generally fall in the per-decom position.

All three existing methods may be analyzed with a computation geometry view. In terms of per-decomposition, HiCuts (using geometric representation 301 having levels (lvs) 1 and 2 of rule-set 201 as illustrated in FIG. 3A) and HyperCuts (using a geometric representation 302 having level 1 of rule-set 201 as illustrated in FIG. 3B) partition the search space through cutting, i.e. decomposition with hyperplanes perpendicular to one dimension and containing equi-partition points of the dimension.

Figure 4B:
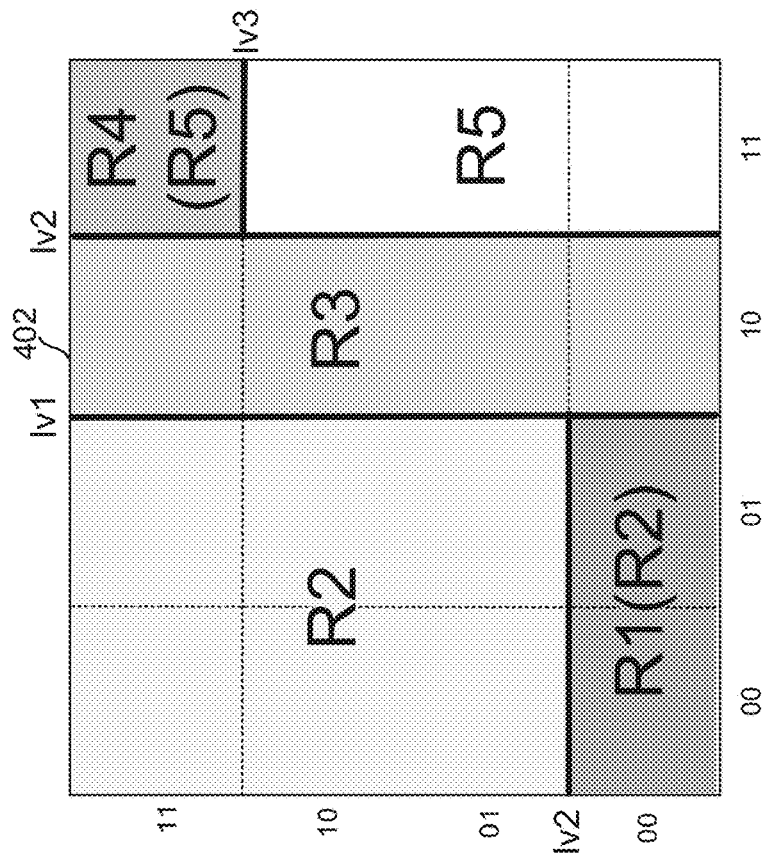
FIG. 4B illustrates a search structure for a rule-set constructed using a HyperSplit method for packet classification.

In contrast, HyperSplit (using a geometric representation 402 of rule-set 201 as illustrated in FIG. 4B) uses splitting, i.e. decomposition with hyperplanes perpendicular to one dimension and having rule projected boundary points of the dimension. Cutting is implemented using hash while splitting using arithmetic comparison. Cutting may have faster indexing speed than splitting. However, because splitting is conducted along the rule boundary, splitting may have better-balanced child sub-spaces than cutting in terms of rule number.

Figure 4A:
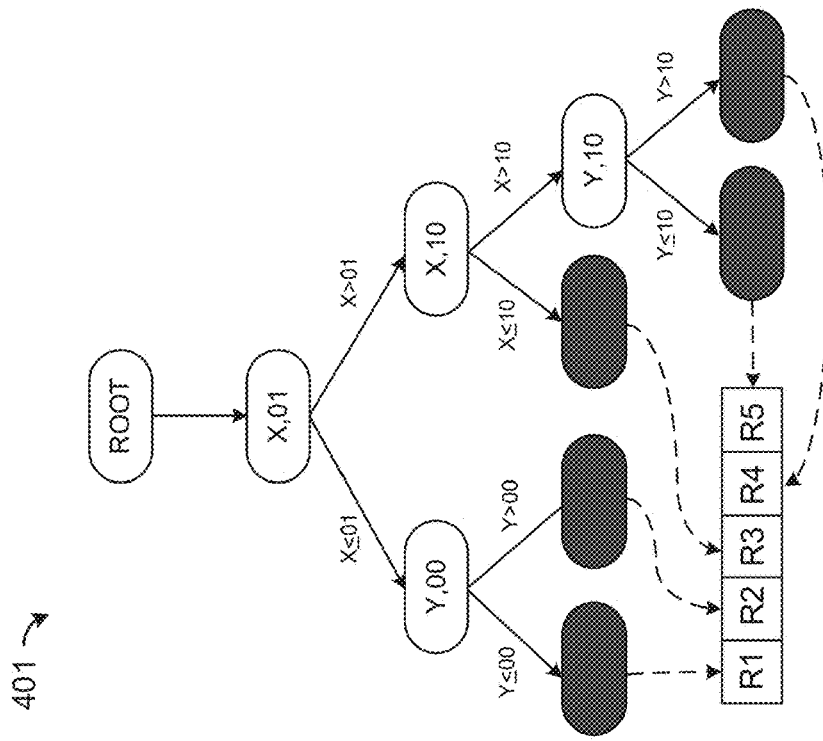
FIG. 4A illustrates a space decomposition of a geometric representation of a rule-set using a HyperSplit method for packet classification.

FIG. 4A illustrates a search structure 401 that may be constructed from the geometric representation 402 of rule-set 201 using HyperSplit. In spite of relatively high performance of HyperSplit for its balanced splitting, HyperSplit still uses a relatively large amount of rules for each child node due to its binary splitting in the per-decomposition stage.

The present technology, FastSplit, incorporates the strengths of both cutting based methods HiCuts/HyperCuts as well as the splitting based method HyperSplit. FastSplit includes constructing a search structure, such as a decision tree structure, by boundary splitting and multi-dimensional splitting of a geometric representation of a rule-set and recursively searching the search structure by using heading information to obtain a stored rule for the packet.

Figure 9:
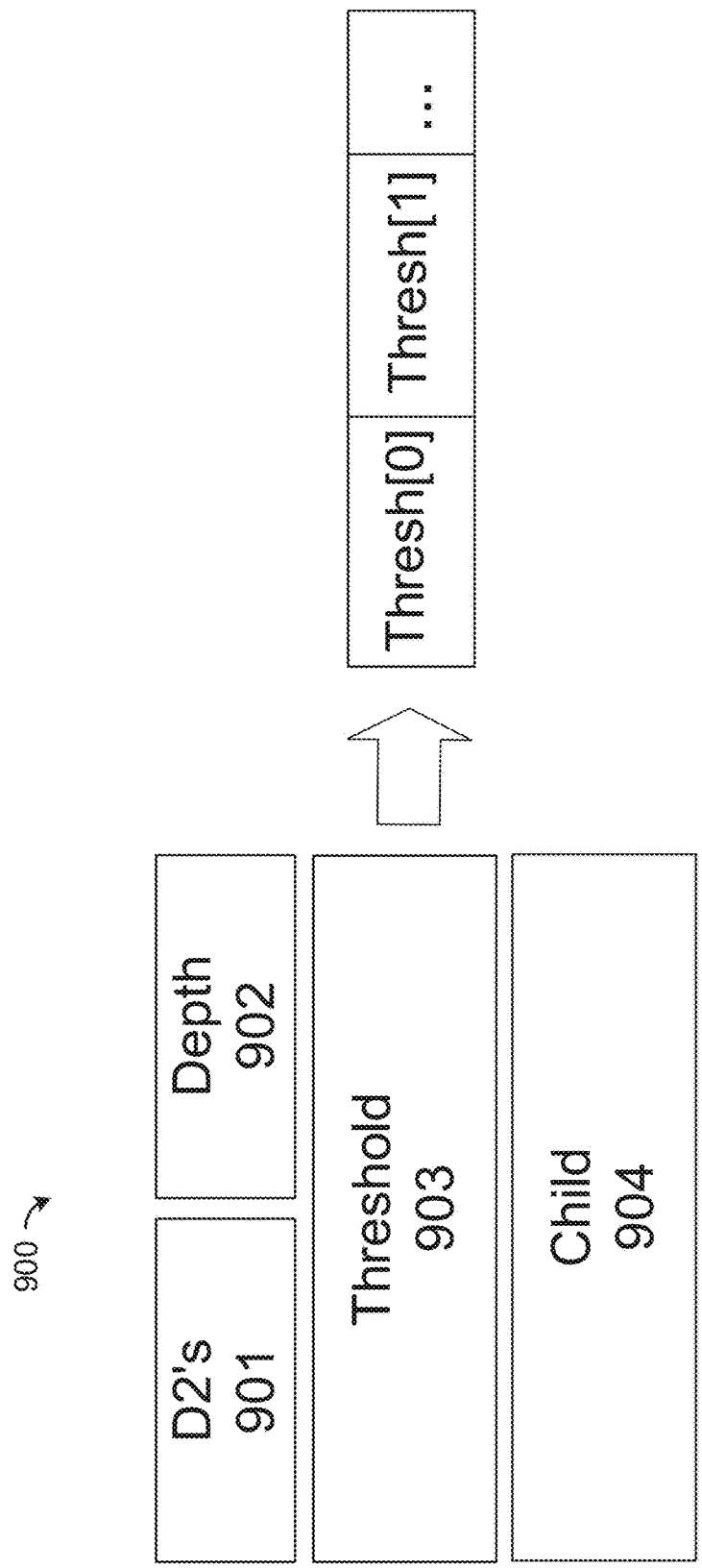
FIG. 9 illustrates a data structure for each node with a memory constraint according to embodiments of the present technology.

FastSplit constructs a decision tree structure using a particular node structure, i.e. the per-decomposition stage. FIG. 9 illustrates a node structure 900 used in FastSplit. In an embodiment, node structure 900 has variables that includes dimension-to-split (D2's) 901 which denotes a dimension array to split, depth 902 which denotes a base pointer, threshold 903 (memory threshold or Thresh[0], Thresh[1] . . . ) which denotes the splitted points in each dimension and child 904 which denotes a base pointer pointing to the child nodes according to an embodiment. In other embodiments, more or less variables may be used. Three points of the node construction of FastSplit follows:

Each Space Decomposition: FastSplit splits the search space along the rule boundary, which reduces the rule replication possibility. The rule boundary that FastSplit selects is guided by a heuristic selection strategy aimed to make the decision tree structure as balanced as possible.

Multi-dimensional Splitting: FastSplit conducts k-splits on n-dimensions for each node in a search structure to make full use of the global heuristic information, which may ensure the rule number of each child node decrease as fast as possible.

Memory Constraints: FastSplit limits the memory size of each node under a threshold $T_{mem}$, the platform intrinsic cache line size, to let the node read operation finished within one memory access time.

Figure 6:
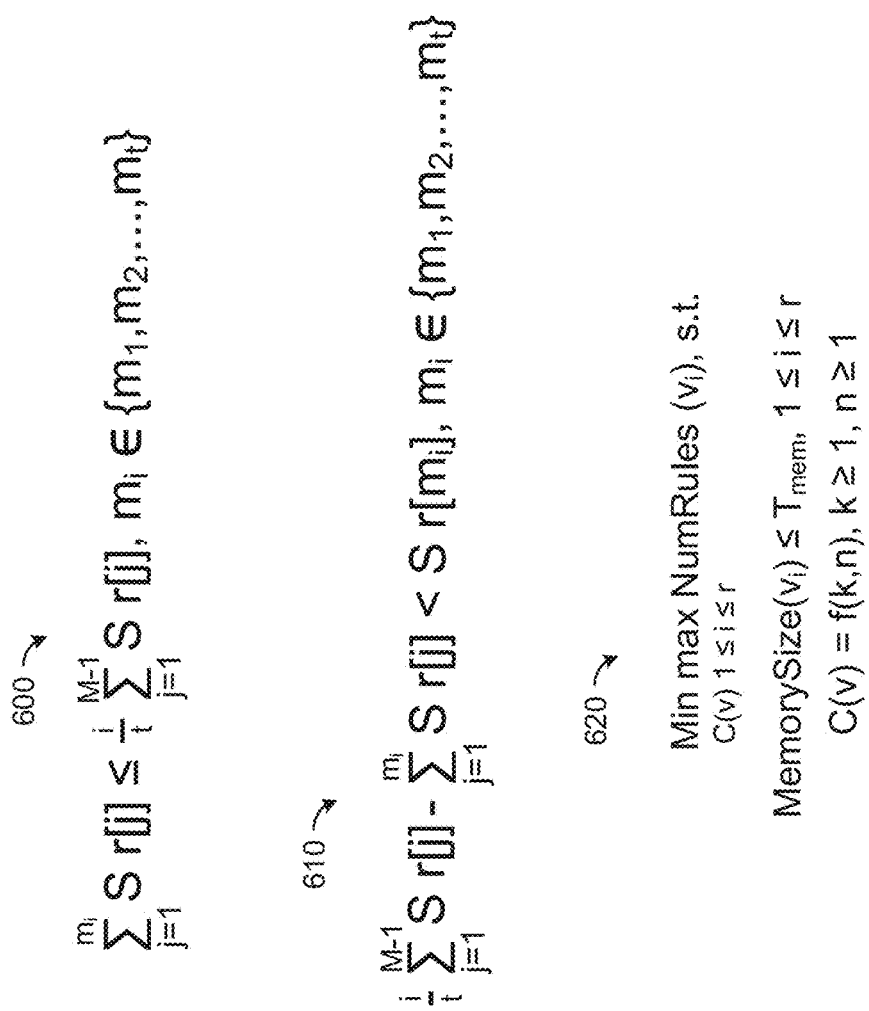
FIG. 6 illustrate equations for packet classification according to embodiments of the present technology.

For the each space decomposition, consider conducting t splits on one dimension, FastSplit first projects all the rules onto the dimension, and thus obtains M end-points together with M−1 segments: $Pt[i](1 \leq i \leq M)$, $Seg[j](1 \leq j \leq M-1)$ Then, FastSplit selects t end-points as the decomposition points. Let Sr[j] be the number of rules overlapping with Seg[j], which is used as the splitting weight. The t end-points $Pt[m_1]$, $Pt[m_2]$, $Pt[m_t]$ satisfy equations at 600 and 610 in FIG. 6.

On multi-dimensional splitting, to obtain the value of k and n and the correspondences of splits and dimensions, the original problem may be formulated as the following optimization problem. $v_i$, $1 \leq i \leq r$ denotes the child node to be generated and the child node set is $\{v_1, v_2, \ldots, v_r\}$. C(v) is the concrete splitting procedure, i.e. how many equal splits are conducted for each dimensions as illustrated at 620 in FIG. 6.

General optimization solutions may be adopted to solve this problem. To continue to ask the question that provided a fixed memory space, how fast can packet classification method be, additional memory constraints may be added to the equation at 620. Therefore, heuristic solutions are an alternative further step to solve the problem and accelerate the pre-processing time of FastSplit.

Figures 5A, 5B:
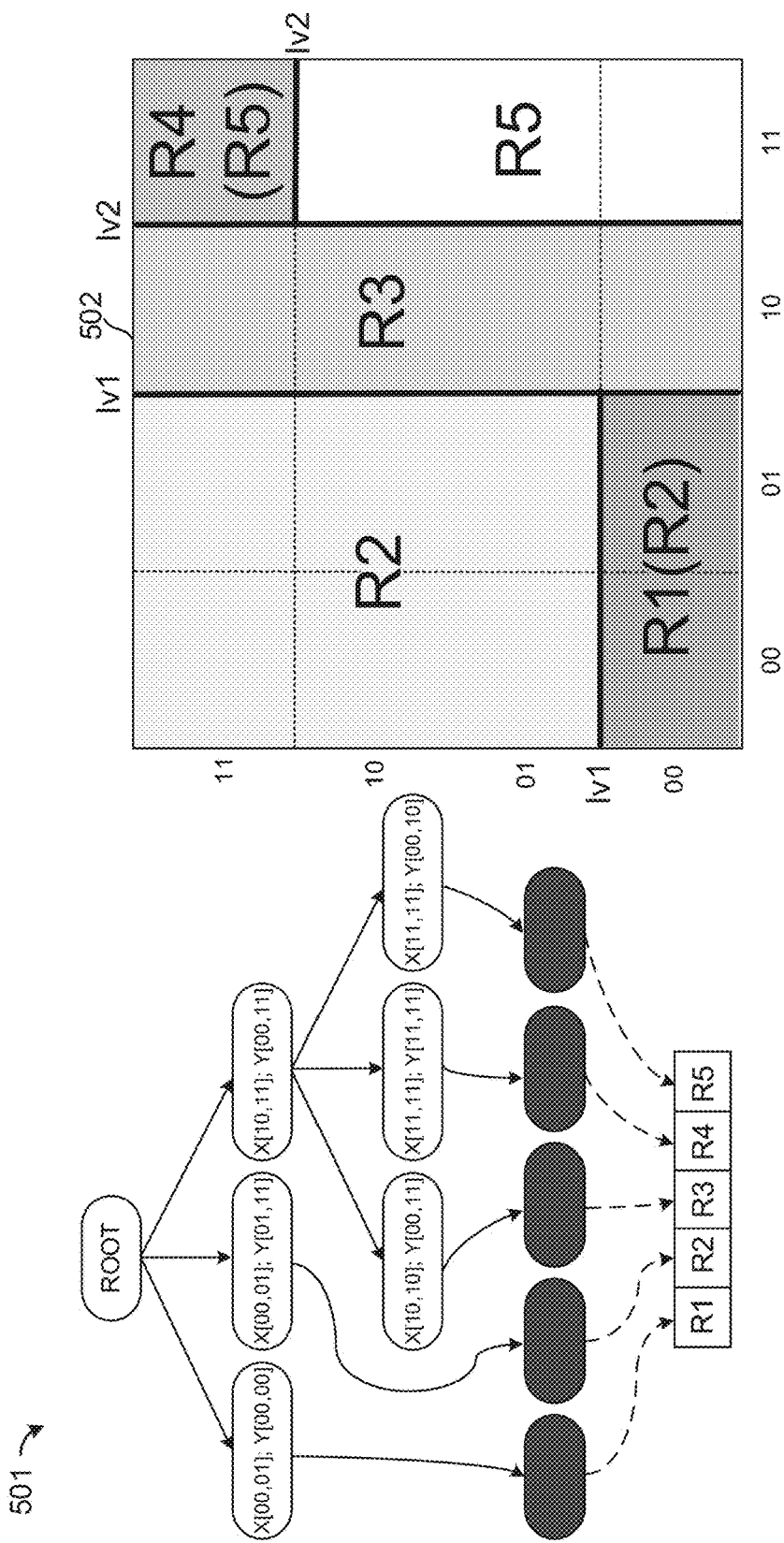
FIG. 5A illustrates a space decomposition of a geometric representation of a rule-set using a method for packet classification according to embodiments of the present technology.
FIG. 5B illustrates a search structure for a rule-set constructed using a method for packet classification according to embodiments of the present technology.

FIG. 5B illustrates constructing a geometric representation 502 of a rule-set 201 using FastSplit according to embodiments. FIG. 5A illustrates a search structure 501, such as a decision tree structure, having a plurality of nodes constructed using FastSplit. In an embodiment, search structure 501 is constructed by splitting rule boundaries and multi-dimensional space of geometric representation 502 as well as using memory constraints on nodes in search structure 501. In particular, at the first level of search structure 501, FastSplit splits the whole space, i.e. root node, on dimensions X and Y as illustrated by two bold lv1 lines in FIG. 5B and generates three internal nodes X[00,01];Y[00,00], X[00,01];Y[01,11], and X[10,11];Y[00,11]. At the second level, FastSplit splits the space X[10,11];Y[00,11] on dimensions X and Y as illustrated by two bold lv2 lines in FIG. 5B and generates three internal nodes X[10,10];Y[00,11], X[11,11];Y[11,11], and X[11,11];Y[00,10].

In an embodiment, search structure 501 is stored in memory accessible by a circuit, such as a processor. A plurality of rules R1-R5 are stored in leaf (or blackend) nodes of search structure 501 that may be searched and obtained using header information from a received packet. Leaf nodes illustrated in FIG. 5A represent memory locations that stores the rules (R1, R2, . . . ) or which rule to use (per the dashed line) upon completion of a search of a search structure 501.

A node structure 900 for each node of search structure 501 is illustrated in FIG. 9. Because FastSplit uses splitting, i.e. the arithmetic comparison method, for the per-decomposition stage, the memory consumption and processing cost may be larger than cutting, i.e. the hash strategy. Therefore the split number should be limited under a threshold to prevent the node memory usage from exceeding the memory cache size in an embodiment.

For a search structure 501 having a node structure 900, a search for a rule that indicates an action to be taken on a packet may be performed by method 1000 of FIG. 10 in an embodiment. In an embodiment, method 1000 recursively traverses each depth of a search structure 501 and returns a rule stored in a leaf node.

Figure 7:
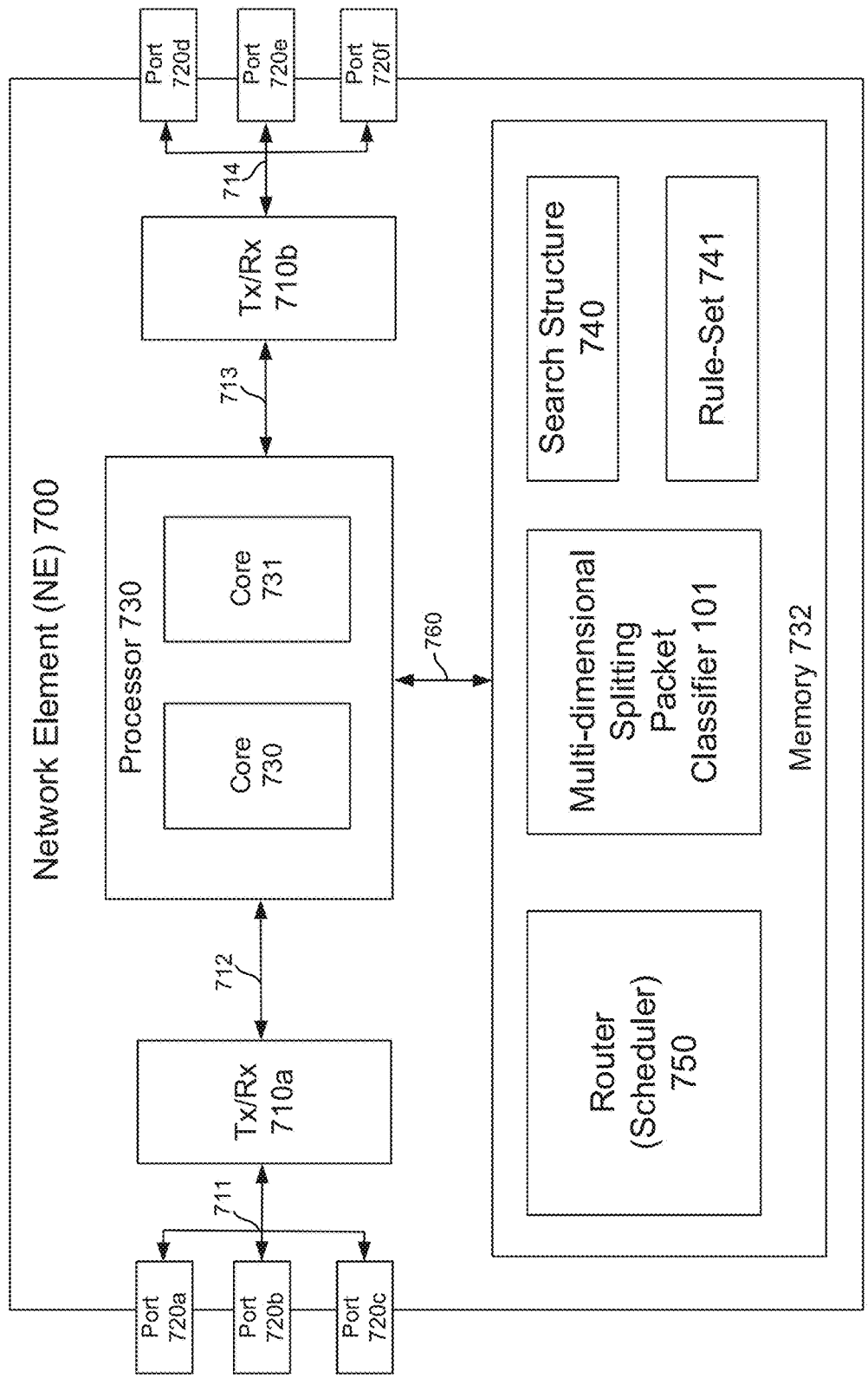
FIG. 7 illustrates a network element according to embodiments of the present technology.

FIG. 7 illustrates a network element 700 according to embodiments of the present technology. Network element 700 is any device that transports or transfers packets through (to or from) a network in embodiment, such as a switch (including switch fabric), router, bridge, firewall, intrusion detection system (IDS), quality of service (QoS), server, a client, etc. Network element 700 may be configured to implement and/or support a packet classifier as described herein. Network element 700 may be implemented in a single network element or the functionality of network element 700 may be implemented in a plurality of network elements. One skilled in the art will recognize that the term network element encompasses a broad range of devices. In embodiments, network element 700 (or components thereof) may correspond to computing device 110 as shown in FIG. 1.

At least some of the components/methods described in the disclosure are implemented in a network apparatus or component such as network element 700. For instance, the components/methods in the disclosure may be implemented using hardware, firmware, and/or software installed to run on hardware.

As shown in FIG. 7, the network element 700 comprises transceivers (Tx/Rxs) 710*a-b*, which may be transmitters, receivers, or combinations thereof. In embodiments, more or less transceivers may be used. A Tx/Rx 710*a* is coupled to a plurality of ports 720*a*-420*c* via signal path 711 for transmitting and/or receiving packets from via links. Tx/Rx 710*a* is also coupled to processor 730 via signal path 712. Similarly, Tx/Rx 710*b* is coupled to a plurality of ports 720*d*-720*f* via signal path 714 for transmitting and/or receiving packets from other links. Tx/Rx 710*b* is also coupled to processor 730 via signal path 713.

A processor 730 is coupled to each Tx/Rxs 710*a-b* to process the packets (and classify the packets) and/or determines where to send the packets to in response to the classification (or what action to take on the packet) in embodiments. In an embodiment, processor 730 may include one or more types of electronic processors having one or more cores. In an embodiment, processor 730 is an integrated circuit processor that executes (or reads) computer instructions that may be included in code and/or computer programs stored on a non-transitory memory to provide at least some of the functions described herein. In an embodiment, processor 730 is a multi-core processor capable of executing multiple threads. In an embodiment, processor 730 operates in response to one or more clock signals having clock cycles. In an embodiment, processor 730 includes cores 730-731. In an embodiment, processor 730 is a digital signal processor, baseband circuit, field programmable gate array, digital logic circuit and/or equivalent. In an embodiment, processor 730 may be part of one or more application specific integrated circuits (ASICs) and/or digital signal processors (DSPs).

Processor 730 communicates with memory 732 via signal path 760, such as reads instructions, read values, write values and transfers packets to and from memory 732. In an embodiment, signal path 760 may be a bus or interconnect to transfer signals between processor 730 and memory 732. Signal path 760 may also transfer control signals between processor 730 and memory 732. Memory 732 may be a non-volatile memory that stores instructions as well as acts as a data store, cache, queue, buffer and/or equivalent.

A processor 730 (or cores of processor 730) may execute a software component having instructions, such as multi-dimensional splitting packet classifier 101, to perform function as described herein. For example, processor 730 executes multi-dimensional splitting packet classifier 101 to construct a search structure 740 base on a rule-set 741. As described herein, search structure 740 may include a decision tree structure having a plurality of nodes stored in memory 732. Further, processor 730 may executes multi-dimensional splitting packet classifier 101 to search the search structure 740 using header information from a received packet to obtain a rule stored in search structure 740 that indicates an action to be taken on the packet.

Figure 8:
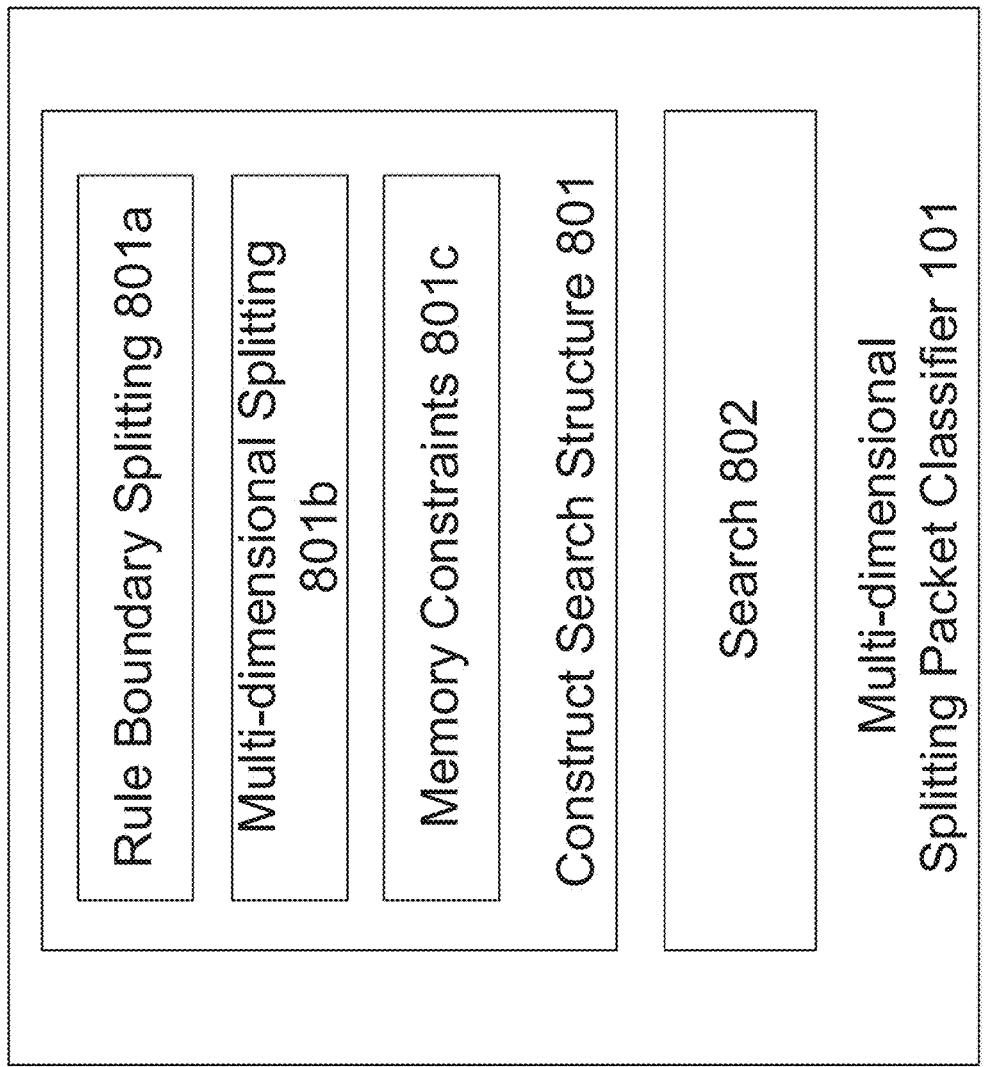
FIG. 8 illustrates a software architecture according to embodiments of the present technology.

Memory 732 also stores another software component, router 750 that directs the incoming packet to a destination based on the classification. In an embodiment, router 750 also includes a scheduler to determine the outputting of received packets stored in queues (in memory 732) to particular destinations. In embodiments, a scheduler may employ a variety of different types of fairness methods, including FIFO (First-in, First-out), WFQ (Weighted Fair Queuing), max-min A software architecture embodiment of multi-dimensional splitting packet classifier 101 is illustrated in FIG. 8 and described in detail herein. Further, multi-dimensional splitting packet classifier 101 effects a transformation of a particular article (such as a network element or network) to a different state.

Memory 432, as well as other memories described herein, may comprise any type of system memory such as SRAM, ternary content-addressable memory (TCAM), dynamic random access memory (DRAM), synchronous DRAM (SDRAM), read-only memory (ROM), a combination thereof, or the like. In an embodiment, a memory 432 may include ROM for use at boot-up, and DRAM for program and data storage for use while executing computer instructions. In embodiments, memory 432 is non-transitory or non-volatile integrated circuit memory storage. Similarly, storages described herein may be non-transitory or non-volatile integrated circuit memory storage.

In an embodiment, nodes of search structure 740 are constrained to a memory threshold. In other words, processor 730 may read a value from a node in search structure 740 within a single memory access time. In an embodiment, a memory access time indicates a predetermined number of clock cycles for a processor 730 to perform a read operation on a memory location storing a value for a node in search structure 740. In an embodiment, a memory size of each node in search structure 740 is under a memory threshold $T_{mem}$, processor 730's intrinsic cache (or memory) line size, to enable a read operation of a node to be completed within one memory access time.

Further, memory 732 may comprise any type of memory storage device configured to store data, store computer programs including instructions, and store other information and to make the data, computer programs, and other information accessible via signal path 760. Memory 732 may comprise, for example, one or more of a solid state drive, hard disk drive, magnetic disk drive, optical disk drive, and/or an equivalent.

For clarity in describing the present technology, some typical components in a network element 700 are not shown in FIG. 7. For example, network element 700 may include additional signal paths (exterior or interior) and/or interface circuits in embodiments. For example, one or more control signals may be provided to network element 700 by way of signal path from a controller in an embodiment. In an embodiment, one or more control signals or clock signals may be input to processor 730 to control a particular state or operation of network element 700.

In an embodiment, network element 700 classifies a packet and does not route or determine where to send the packet. In embodiments, a packet classifier may determine which QoS class a particular received packet belongs to by reading a header field or identifier in the packet. In an embodiment, a packet includes digital information that may represent, among other types of information, text, voice, image, video, data, game or control (status) information. In an embodiment, the packets are received from a cellular network having a base station with an antenna to receive cellular (radio frequency) signals having the information. Based on the classification of a received packet, the packet is forward to a destination in an embodiment.

FIG. 8 illustrates a software architecture 800 according to embodiments of the present technology. In embodiments, multi-dimensional splitting packet classifier 101 includes a plurality of software components, such as rule boundary splitting 801*a*, multi-dimensional splitting 801*b*, memory constraints 801*c* as well as search 802. In embodiments, software components may be embodied as a computer program, object, function, subroutine, method, software instance, script, a code fragment, stored in an electronic file, singly or in combination. In order to clearly describe the present technology, software components shown in FIG. 8 (as well as in FIGS. 1 and 7) are described as individual software components. In embodiments, the software components illustrated, singly or in combination, may be stored (in single or distributed computer-readable storage medium (s)) and/or executed by a single or distributed computing device (processor or multi-core processor) architecture. Functions performed by the various software components described herein are exemplary. In other embodiments, software components identified herein may perform more or less functions. In embodiments, software components may be combined or further separated.

In embodiments, software components illustrated herein may be replaced with similar hardware components or logic/circuits which are configured to perform similar functions.

Rule boundary 801*a* is responsible for, among other functions, splitting a rule boundary of a geometric representation of a rule-set to construct a search structure having a plurality of nodes to store rules. In an embodiment, rule boundary 801*a* performs the function of constructing a search structure 740 by splitting a search space by a one or more rule boundaries.

Multi-dimensional splitting 801*b* is responsible for, among other functions, splitting a dimension of a geometric representation of a rule-set to construct a search structure having a plurality of nodes to store rules. In an embodiment, multi-dimensional splitting 801*b* performs the function of constructing a search structure 740 by splitting a search space by a one or more dimensions.

Memory constraint 801*c* is responsible for, among other functions, limits the memory size of each node in a search structure under a memory threshold $T_{mem}$, a hardware component's intrinsic cache line size, to enable a read operation of a node to be completed within one memory access time. In an embodiment, a memory access time indicates a predetermined number of clock cycles for a hardware component to perform a read operation on a memory location storing a value for a node in search structure.

Search 802 is responsible for, among other functions, searching a search structure, such as a decision tree structure having a plurality of nodes at a plurality of depths. Search 802 uses header information from a packet to obtain a rule stored in a node, such as a leaf node, that indicates action to be taken on the packet. In an embodiment, search 802 recursively traverses each depth in the plurality of depths of the search structure to obtain the rule from a leaf node in a plurality of leaf nodes.

Figure 11:
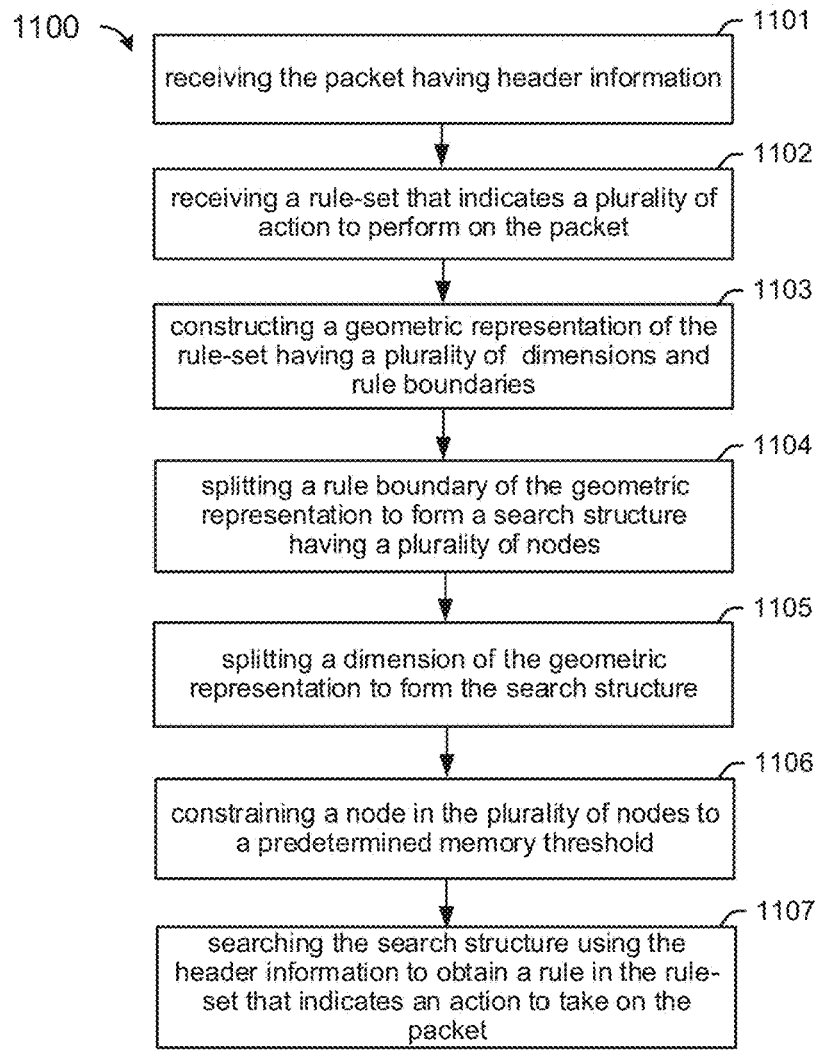
FIGS. 11-13 illustrate packet classifying methods according to embodiments of the present technology.
Figure 12:
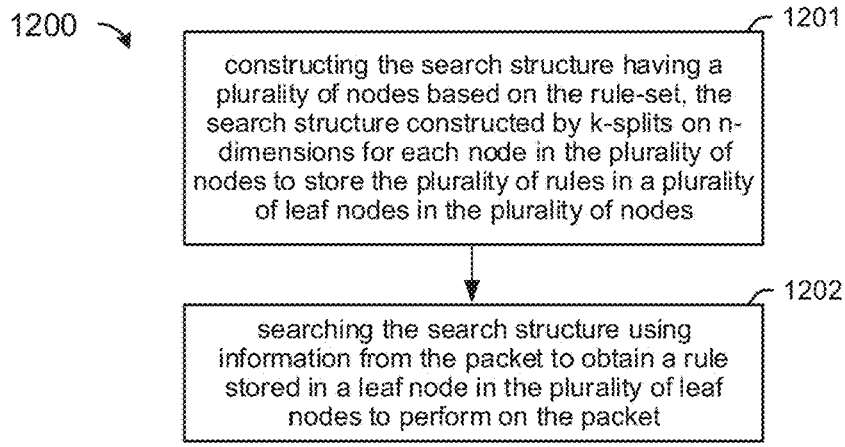
Figure 13:
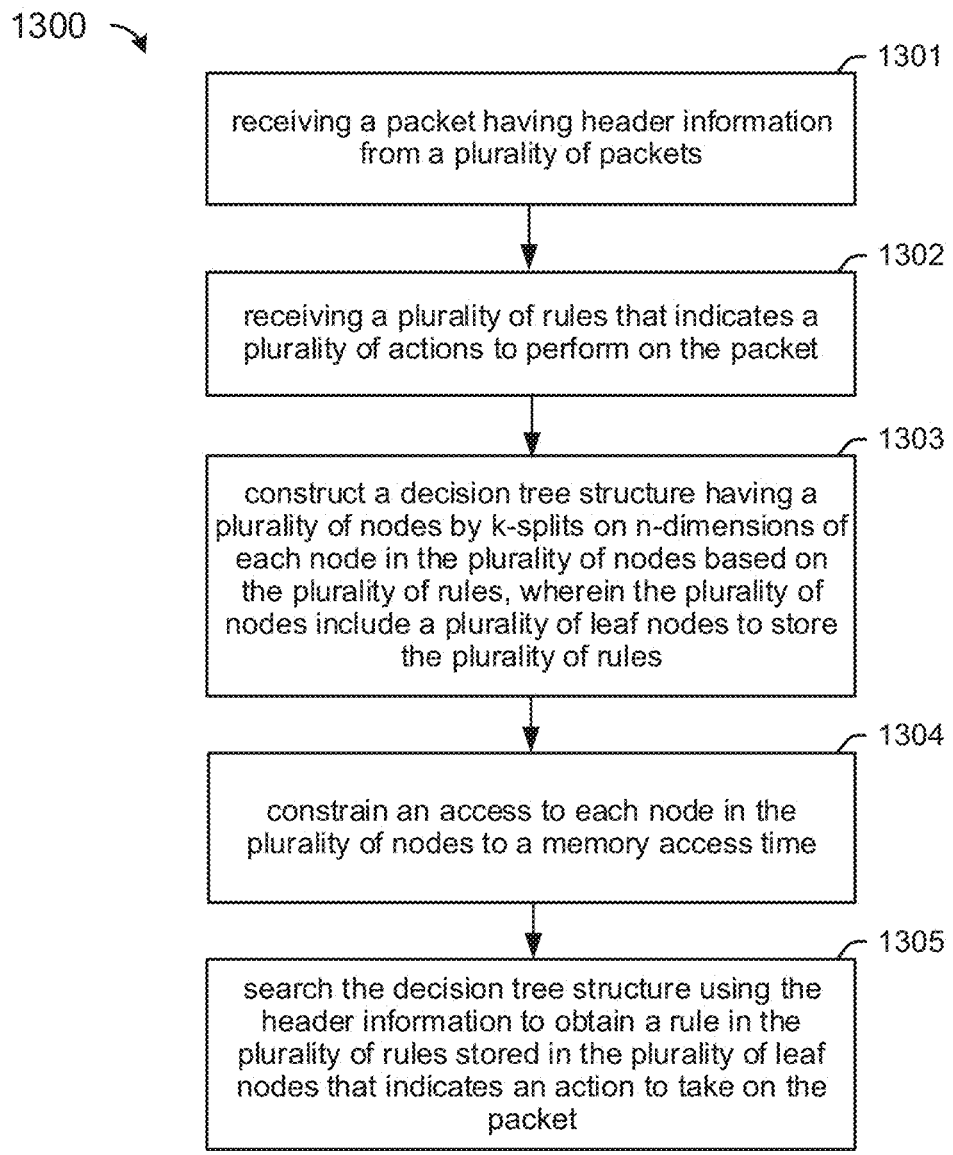

FIGS. 11-13 are flowcharts that illustrate a method of operating a network according to embodiments of the present technology. In embodiments, methods shown in FIGS. 11-13 illustrate classifying a packet by using multi-dimensional splitting. In embodiments, methods illustrated in FIGS. 11-13 are computer-implemented methods performed, at least partly, by hardware and/or software components illustrated in FIGS. 1, and 7-9 and as described herein. In an embodiment, software components executed by one or more processors, such as processor 730 shown in FIG. 7, perform at least a portion of the methods. In other embodiments, hardware components perform one or more functions described herein.

FIG. 11 is a flowchart that illustrates a method 1100 of classifying a packet according to embodiments of the present technology. In FIG. 11 at 1101 one or more packets having header information is received. In an embodiment, this function as well as the function at 1102-1107 are performed by one or more components illustrated in FIGS. 1 and 7-9. In embodiments, ports 720*a-f* and Tx/Rx 710*a-b* as shown in FIG. 7, performs at least a portion of this function.

At 1102 a rule-set that indicates a plurality of actions to perform on a packet is received. In embodiments, ports 720*a-f* and Tx/Rx 710*a-b* as shown in FIG. 7, performs at least a portion of this function. In other embodiment, other ways of receiving a packet may be employed. A rule-set, such as rule-set 741 illustrated in FIG. 7, is received and stored in memory, such as memory 732.

At 1103 a geometric representation of the rule-set having a plurality of dimensions and rule boundaries is constructed. In embodiments, multi-dimensional splitting packet classifier 101 executed by processor 730 performs at least a portion of this function.

At 1104 a rule boundary of the geometric representation is split to form a search structure having a plurality of nodes. In embodiments, multi-dimensional splitting packet classifier 101 executed by processor 730 performs at least a portion of this function. In an embodiment, a search structure 740 is constructed and stored in memory 732 as illustrated in FIG. 7.

At 1105 a dimension of the geometric representation is split to form the search structure. In embodiments, multi-dimensional splitting packet classifier 101 executed by processor 730 performs at least a portion of this function. In an embodiment, a search structure 740 is constructed and stored in memory 732 as illustrated in FIG.

At 1106 a node in the plurality of nodes is constrained to a predetermined memory threshold. In embodiments, each node in the plurality of nodes of the search structure is limited to being accessed within a single memory access time of memory 732 by processor 730.

At 1107 a search structure is searched using the header information to obtain a rule in the rule-set that indicates an action to take on the packet. In embodiments, multi-dimensional splitting packet classifier 101 executed by processor 730 performs at least a portion of this function. In an embodiment, search structure 740 is searched using information in one or more header fields of an incoming packet to obtain a rule that indicates an action to take on the packet stored in a leaf node of search structure 740.

FIG. 12 is a flowchart that illustrates a method 1200 of classifying a packet according to embodiments of the present technology. In FIG. 12 at 1201 a search structure having a plurality of nodes is constructed based on a rule-set. The search structure is constructed by k-splits on n-dimensions for each node in the plurality of nodes to store the plurality of rules in a plurality of leaf nodes. In embodiments, multi-dimensional splitting packet classifier 101 executed by processor 730 performs at least a portion of the functions in method 1200.

At 1202 a search structure is searched using information from the packet to obtain a rule stored in a leaf node in the plurality of leaf nodes to perform on the packet.

FIG. 13 is a flowchart that illustrates a method 1300 of classifying a packet according to embodiments of the present technology. In embodiments, multi-dimensional splitting packet classifier 101 executed by processor 730 performs at least a portion of the functions in method 1300.

At 1301 a packet having header information from a plurality of packets is received. In embodiments, ports 720a-f and Tx/Rx 710a-b as shown in FIG. 7, performs at least a portion of the function at 1301 and 1302.

At 1302 a plurality of rules that indicates a plurality of actions to perform on the packet is received. A plurality of rules, such as rule-set 741 illustrated in FIG. 7, is received and stored in memory, such as memory 732.

At 1303 a decision tree structure having a plurality of nodes is constructed by k-splits on n-dimensions of each node in the plurality of nodes based on the plurality of rules. The plurality of nodes include a plurality of leaf nodes to store the plurality of rules At 1304 an access to each node in the plurality of nodes is constrained to a memory access time.

At 1305 a decision tree structure is searched using the header information to obtain a rule in the plurality of rules stored in the plurality of leaf nodes that indicates an action to take on the packet.

Figure 14:
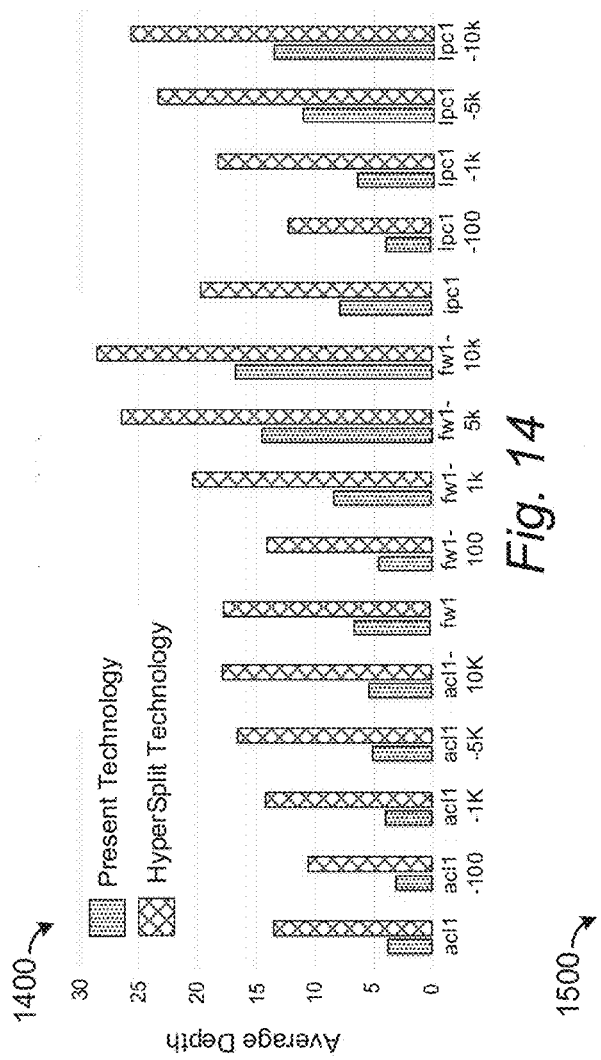
FIGS. 14-16 illustrates graphs comparing a HyperSplit packet classifying with embodiments of the present technology.
Figure 15:
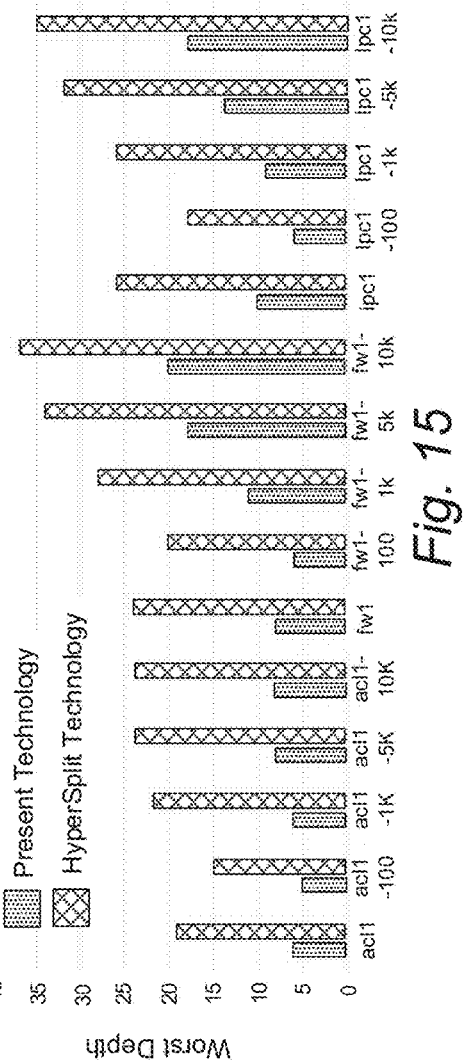
Figure 16:
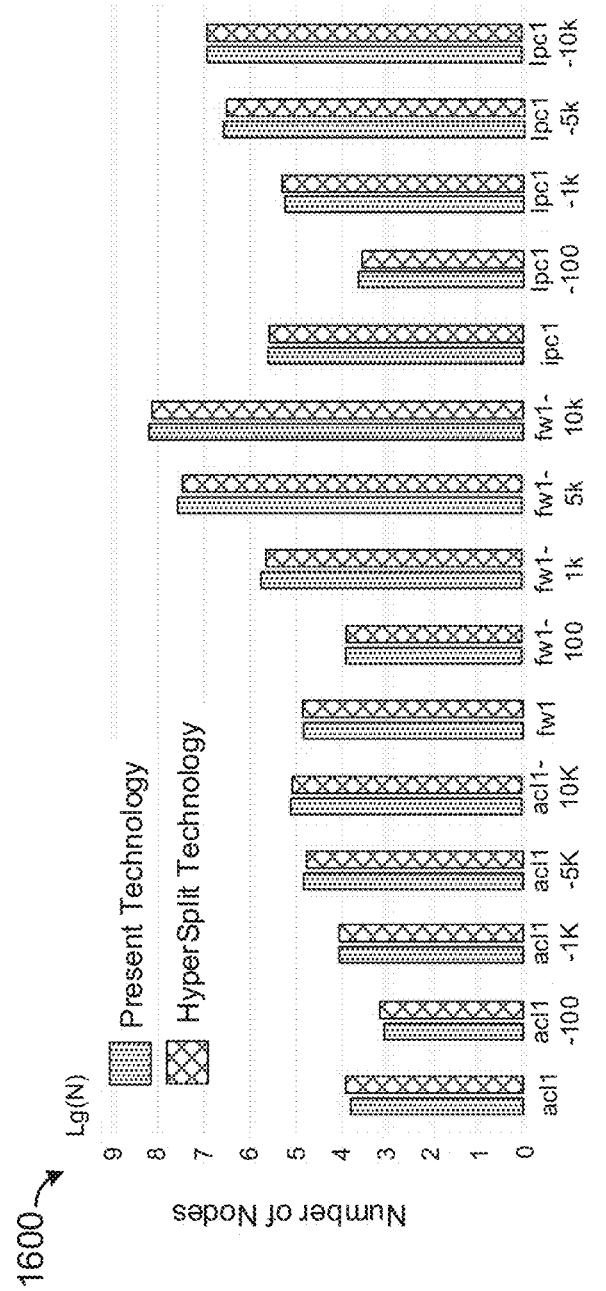

FIGS. 14-16 illustrate comparisons between embodiments of the present technology, FastSplit, and HyperSplit technology. Evaluation results were obtained using Access Control (ACL), Firewall (FW) and IP Chain (IPC) rule-sets provided by "Classbench: a packet classification benchmark," in *Proceedings IEEE 24th Annual Joint Conference of the IEEE Computer and Communication Societies*, vol. 3. IEEE, 2005, pp. 2068-2079. FIGS. 14-16 illustrate results when using access control (acl1, acl1-100, . . . ), firewall (fw1, fw1-100, . . . ) and IP chain (ip1, ip1-100, . . . ) rule-sets cited above.

FIG. 14 illustrates a graph 1400 showing a comparison between an average depth of a FastSplit and HyperSplit search structure using the above rule-sets. FIG. 15 illustrates a graph 1500 showing a comparison between a worst depth of FastSplit and HyperSplit search structure using the above rule-sets. FIG. 16 illustrates a graph 1600 showing a comparison between a number of nodes of FastSplit and HyperSplit search structure using the above rule-sets.

In the case of average depth and worst depth, FastSplit generally performs better than HyperSplit. However on memory usage, indicated by the number of nodes used, FastSplit and HyperSplit use almost the same number of nodes.

In embodiments, FastSplit uses less nodes in a search structure than HyperSplit, thus FastSplit may achieve less memory usage.

Returning to FIG. 1, computing device 110 includes a user interface that may include computer instructions that may be executed by a processor as well as additional hardware components in embodiments. A user interface may include input devices such as a touchscreen, microphone, camera, keyboard, mouse, pointing device and/or position sensors. Similarly, a user interface may include output devices, such as a display, vibrator and/or speaker, to output images, characters, vibrations, speech and/or video as an output. A user interface may also include a natural user interface where a user may speak, touch or gesture to provide input. In embodiments, a user interface may be used to control or provide inputs to a multi-core lock-free rate limiter technology as described herein.

Advantages of the present technology may include, but are not limited to, providing a packet classifier that may achieve better performance as compared to other technologies. For example, the packet classifier may have better search speed as well less memory usage of a search structure.

The flowcharts and block diagrams in the figures illustrate the architecture, functionality, and operation of possible implementations of a device, apparatus, system, computer-readable medium and method according to various aspects of the present disclosure. In this regard, each block (or arrow) in the flowcharts or block diagrams may represent operations of a system component, software component or hardware component for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block (or arrow) of the block diagrams and/or flowchart illustration, and combinations of blocks (or arrows) in the block diagram and/or flowchart illustration, can be implemented by special purpose hardware-based systems that perform the specified functions or acts, or combinations of special purpose hardware and computer instructions.

It will be understood that each block (or arrow) of the flowchart illustrations and/or block diagrams, and combinations of blocks (or arrows) in the flowchart illustrations and/or block diagrams, may be implemented by non-transitory computer instructions. These computer instructions may be provided to and executed (or read) by a processor of a general purpose computer, special purpose computer (or network element), or other programmable data processing apparatus to produce a machine, such that the instructions executed via the processor, create a mechanism for implementing the functions/acts specified in the flowcharts and/or block diagrams.

As described herein, aspects of the present disclosure may take the form of at least a system, an apparatus, a device (network element) having one or more processors executing instructions stored in non-transitory memory, a computer-implemented method, and/or a non-transitory computer-readable storage medium storing computer instructions.

Non-transitory computer-readable media includes all types of computer-readable media, including magnetic storage media, optical storage media, and solid state storage media and specifically excludes signals. It should be understood that software including computer instructions can be installed in and sold with a computing device (network element) having computer-readable storage media. Alternatively, software can be obtained and loaded into a computing device, including obtaining the software via a disc medium or from any manner of network or distribution system, including, for example, from a server owned by a software creator or from a server not owned but used by the software creator. The software can be stored on a server for distribution over the Internet, for example.

More specific examples of the computer-readable medium include the following: a portable computer diskette, a hard disk, a random access memory (RAM), ROM, an erasable programmable read-only memory (EPROM or Flash memory), an appropriate optical fiber with a repeater, a portable compact disc read-only memory (CD-ROM), an optical storage device, a magnetic storage device, or any suitable combination thereof.

Non-transitory computer instructions used in embodiments of the present technology may be written in any combination of one or more programming languages. The programming languages may include an object oriented programming language such as Java, Scala, Smalltalk, Eiffel, JADE, Emerald, C++, CII, VB.NET, Python, R or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The computer instructions may be executed entirely on the user's computer (or network element), partly on the user's computer, as a stand-alone software package, partly on the user's computer and partly on a remote computer (network controller), or entirely on the remote computer or server. In the latter scenario, the remote computer may be connected to the user's computer through any type of network, or the connection may be made to an external computer (for example, through the Internet using an Internet Service Provider) or in a cloud computing environment or offered as a service such as a Software as a Service (SaaS).

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

Although the subject matter has been described in language specific to structural features and/or methodological steps, it is to be understood that the subject matter defined in the appended claims is not necessarily limited to the specific features or steps (acts) described above. Rather, the specific features and steps described above are disclosed as example forms of implementing the claims.

What is claimed is:

1. A computer-implemented method to classify a packet received from a network, the method comprising:
   receiving the packet wherein the packet includes header information;
   obtaining a rule-set that indicates a plurality of actions to perform on the packet;
   constructing a geometric representation of the rule-set wherein the geometric representation has a plurality of dimensions and a plurality of rule boundaries;
   splitting the geometric representation along each of the rule boundaries to form a search structure having a plurality of nodes;
   splitting multi-dimensions of the geometric representation to form the search structure, wherein the splitting each of the rule boundaries and the splitting the multi-dimensions includes having k-splits and n-dimensions for each node;
   constraining a node in the plurality of nodes to a predetermined memory threshold; and
   searching the search structure using the header information to obtain a rule in the rule-set that indicates an action to take on the packet.

2. The computer-implemented method of claim 1, wherein the search structure is a decision tree structure having a plurality of nodes stored in non-volatile memory, wherein the decision tree structure includes a plurality of depths with a plurality of leaf nodes in the plurality of nodes to store a plurality of rules from the rule-set, wherein the searching includes recursively traversing each depth in the plurality of depths to obtain the rule from a leaf node in the plurality of leaf nodes.

3. The computer-implemented method of claim 2, wherein constraining the node in the plurality of nodes includes completing a read operation of the node within a memory access time.

4. The computer-implemented method of claim 1, wherein the rule-set includes a plurality of rules and a set of corresponding priority values and a set of corresponding field values.

5. The computer-implemented method of claim 4, wherein the header information includes one or more header fields to store a binary value that matches a field value in the set of corresponding field values.

6. The computer-implemented method of claim 5, wherein the action to take on the packet includes accept or discard the packet.

7. The computer-implemented method of claim 1, wherein the geometric representation is a D-dimensional search space having N non-overlapping D-dimensional hyper-rectangles.

8. The computer-implemented method of claim 1, wherein the computer-implemented method is performed by one or more integrated circuit processors in communication with one or more integrated circuit memories.

9. A device, comprising:
a memory storage comprising instructions; and
one or more processors in communication with the memory, wherein the one or more processors execute the instructions to:
receive a plurality of packets, each of the packets including header information;
receive a rule-set having a plurality of rules that indicate actions to perform on the packets;
construct a geometric representation of the rule-set wherein the geometric representation has a plurality of dimensions and a plurality of rule boundaries;
split the geometric representation along each of the rule boundaries to form a search structure having a plurality of nodes;
split multi-dimensions of the geometric representation to form the search structure, wherein the splitting each of the rule boundaries and the splitting the multi-dimensions includes having k-splits and n-dimensions for each node;
constrain a node in the plurality of nodes to a predetermined memory threshold; and
search the search structure by using the header information to obtain a rule to perform on the packet, wherein the rule is stored in a leaf node in the plurality of nodes.

10. The apparatus of claim 9, wherein the search structure is a decision tree structure having the plurality of nodes stored in the memory, wherein one or more processors accesses each node in the plurality of nodes within a memory access time.

11. The apparatus of claim 10, wherein the decision tree structure includes a plurality of depths corresponding to the plurality of leaf nodes, wherein the search includes recursively traverse a depth in the plurality of depths to obtain the rule.

12. The apparatus of claim 11, wherein the plurality of rules has a set of corresponding priority values and a set of corresponding header field values, wherein the packet includes header information that matches a header field value in the set of corresponding header field values.

13. The apparatus of claim 9, wherein one or more processors is selected from an integrated circuit processor, field programmable gate array or application specific integrated circuit and wherein the memory is selected from a volatile memory, non-volatile memory or ternary content-addressable memory.

14. A non-transitory computer-readable medium storing computer instructions, that when executed by one or more processors, cause the one or more processors to perform the steps of:
receive a packet having header information from a plurality of packets;
receive rule-set that indicates a plurality of actions to perform on the packet;
construct a decision tree structure having a plurality of nodes by splitting a geometric representation into k-splits on n-dimensions of each node in the plurality of nodes based on the rules rule set, wherein the plurality of nodes include a plurality of leaf nodes to store the plurality of rules;
split the geometric representation along each of the rule boundaries to form the decision tree:
constrain an access to each node in the plurality of nodes to a memory access time; and
search the decision tree structure using the header information to obtain a rule in the rules rule set stored in the plurality of leaf nodes that indicates an action to take on the packet.

15. The non-transitory computer-readable medium of claim 14, wherein the decision tree structure includes a plurality of depths corresponding to the plurality of leaf nodes, wherein the search includes recursively traverse a depth in the plurality of depths to obtain a rule from the rule-set.

16. The non-transitory computer-readable medium of claim 15, wherein the plurality of rules are included in the rule-set having a set of corresponding priority values and a set of corresponding header field values, and wherein the search includes match the header information to a header field value in the set of corresponding header field values to obtain the rule.

17. The non-transitory computer-readable medium of claim 16, wherein the decision tree structure having the plurality of nodes to store the plurality of rules is stored in the non-transitory computer-readable medium, and wherein the memory access time indicates a predetermined number of clock cycles for a circuit to perform a read operation on each node in the plurality of nodes.

* * * * *